(12) United States Patent
Laasik et al.

(10) Patent No.: US 9,930,101 B2
(45) Date of Patent: Mar. 27, 2018

(54) RECEIVING A COMMUNICATION EVENT

(71) Applicant: Microsoft Technology Licensing, LLC, Redmond, WA (US)

(72) Inventors: Marek Laasik, Tallinn (EE); Andrew Macks, Tallinn (EE); Devid Liik, Tallinn (EE); Jonas Kaulakis, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 13/924,415

(22) Filed: Jun. 21, 2013

(65) Prior Publication Data

US 2014/0297719 A1    Oct. 2, 2014

(30) Foreign Application Priority Data

Mar. 28, 2013   (GB) .................................. 1305710.4

(51) Int. Cl.
*H04L 12/70* (2013.01)
*H04L 29/08* (2006.01)
*H04L 12/58* (2006.01)

(52) U.S. Cl.
CPC .............. *H04L 67/10* (2013.01); *H04L 51/12* (2013.01); *H04L 51/36* (2013.01)

(58) Field of Classification Search
None
See application file for complete search history.

(56) References Cited

U.S. PATENT DOCUMENTS 6,717,936 B1    4/2004  Srinivasan
7,516,219 B2    4/2009  Moghaddam et al.
(Continued)

FOREIGN PATENT DOCUMENTS

CN    102025648    4/2011
CN    102047638    5/2011
(Continued)

OTHER PUBLICATIONS

Zaguia, et al., "Interaction Context-Aware Modalities and Multimodal Fusion for Accessing Web Services", Retrieved at <<http://www.ubicc.org/files/pdf/52720101027_527.pdf>>, In Journal of Ubiquitous Computing and Communication, vol. 5, Issue 4, Dec. 15, 2010, pp. 15.

(Continued)

*Primary Examiner* — Scott B Christensen (74) *Attorney, Agent, or Firm* — Schwegman Lundberg & Woessner, P.A.

(57) ABSTRACT

Method, node and user terminal for receiving communication events over a communications network. The method comprising: executing a communication client at the user terminal, the client arranged to operate in one of a plurality of modes, filtering parameters associated with each of the modes are stored in storage at the user terminal; the client detecting a mode that the client is operating in and accessing the filtering parameters associated with the mode from the storage; the communication client transmitting the filtering parameters accessed from said storage to a node in the network, the filtering parameters defining one or more types of communication event that are permitted to be received at the terminal from said network when the communication client is operating in said mode; and receiving only said one or more types of communication event at the terminal from said node when the communication client is operating in said mode.

20 Claims, 4 Drawing Sheets

(56) References Cited

U.S. PATENT DOCUMENTS

| | | | |
|---|---|---|---|
| 8,301,168 | B2 | 10/2012 | Zubas et al. |
| 2003/0204619 | A1* | 10/2003 | Bays .................. H04L 12/2697 709/238 |
| 2004/0143636 | A1 | 7/2004 | Horvitz et al. |
| 2004/0255015 | A1* | 12/2004 | Fitzpatrick et al. .......... 709/223 |
| 2011/0029598 | A1 | 2/2011 | Arnold et al. |
| 2011/0219092 | A1 | 9/2011 | Fukuzato |
| 2011/0249658 | A1* | 10/2011 | Wohlert .................. H04W 4/04 370/338 |
| 2012/0303695 | A1 | 11/2012 | Michel et al. |
| 2013/0198296 | A1* | 8/2013 | Roy et al. ..................... 709/206 |

FOREIGN PATENT DOCUMENTS

| | | |
|---|---|---|
| CN | 102630312 | 8/2012 |
| CN | 102681896 | 9/2012 |
| EP | 1139608 | 10/2001 |
| EP | 2237506 | 10/2010 |
| EP | 2597826 A1 | 5/2013 |
| WO | WO-2009080078 | 7/2009 |

OTHER PUBLICATIONS

"Google Talk Call Signaling", Retrieved at <<https://developers.google.com/talk/call_signaling#Capabilities>>, Nov. 1, 2012, pp. 9.

Raento, et al., "ContextPhone: A Prototyping Platform for Context-Aware Mobile Applications", Retrieved at <<http://www.daimi.au.dk/~bardram/pvc/papers/contextphone.pdf>>, In Journal of IEEE Pervasive Computing, vol. 4, Issue 2, Apr. 2005, pp. 9.

Balachandran, et al., "Active Filters: Delivering Scaled Media to Mobile Devices", Retrieved at <<http://ieeexplore.ieee.org/stamp/stamp.jsp?tp=&arnumber=629373>>, In Proceedings of the IEEE 7th International Workshop on Network and Operating System Support for Digital Audio and Video, May 19, 1997, pp. 10.

Toivonen, et al., "Facilitating Mobile Users with Contextualized Content", Retrieved at <<http://ai-gate.cs.uni-sb.de/~krueger/aims2003/camera-ready/toivonen-5.pdf>>, In Proceedings of the Artificial Intelligence in Mobile Systems (AIMS) Workshop held in Conjunction with Ubicomp, Oct. 2003, pp. 12.

Xu, et al., "Context-Aware Content Filtering & Presentation for Pervasive & Mobile Information Systems", Retrieved at <<http://www-scf.usc.edu/~kxu/xu2008ambisys.pdf>>, In Proceedings of the 1st International Conference on Ambient Media and Systems, Feb. 2008, pp. 8.

"Search Report", GB Application No. 1305710.4, dated Sep. 12, 2014, 3 pages.

"International Search Report & Written Opinion for PCT Patent Application No. PCT/US2014/031532", dated Jun. 16, 2014, Filed Date: Mar. 24, 2014, 9 Pages.

"Foreign Office Action", GB Application No. 1305710.4, dated Dec. 11, 2015, 4 pages.

"Foreign Office Action", GB Application No. 1305710.4, dated Apr. 1, 2016, 5 pages.

"Office Action Issued in United Kingdom Patent Application No. 1305710.4", dated Jun. 22, 2016, 3 Pages.

"Foreign Office Action", CN Application No. 201480018477.0, dated May 18, 2017, 21 pages.

"Second Office Action Issued in Chinese Patent Application No. 201480018477.0", dated Nov. 16, 2017, 6 Pages.

* cited by examiner

RECEIVING A COMMUNICATION EVENT

RELATED APPLICATION

This application claims priority under 35 USC 119 or 365 to Great Britain Application No. 1305710.4 filed Mar. 28, 2013, the disclosure of which is incorporate in its entirety.

BACKGROUND

Some communication systems allow the user of a device, such as a personal computer or mobile device, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

A communications network may comprise a node which can be used to facilitate communications between devices over the network. This node may be arranged to handle communications events that are intended to be delivered to a recipient device. On some networks it is possible for a user to preselect how the node in the communication network directs all communication events for a user to a particular device. This blanket solution is sometimes referred to as "call forwarding". The user can turn on the call forwarding and it is applied until user turns it off. In other systems, the recipient devices receive all communication events and the devices themselves handle the selection of communication events for display to a user associated with the recipient device. This requires the recipient devices to process the incoming data. All of these solutions apply to only a single user context.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of receiving communication events over a communications network. A communication client application is executed at a first user terminal associated with a user. The communication client application is arranged to operate in one of a plurality of modes, wherein each of the plurality of modes are associated with filtering parameters. The filtering parameters associated with each of the plurality of operating modes are stored in storage at the first user terminal. The communication client application detects an operating mode that the communication client application is operating in and accesses the filtering parameters associated with said operating mode from the storage. The communication client application transmits filtering accessed from said storage means to a node in the communications network. The filtering parameters define one or more types of communication event that are permitted to be received at the first user terminal from the network when the communication client application is operating in the operating mode. This enables only the one or more types of communication event to be received at the first user terminal from the network node when the communication client application is operating in the operating mode.

The method may be used for the receipt of communication events to a user associated with a plurality of user devices, whereby the delivery of communication events from the network node to the plurality of user devices is dependent on the operating mode in which the client executed on the respective user devices is operating in.

BRIEF DESCRIPTION OF THE DRAWINGS

For a better understanding of the described embodiments and to show how the same may be put into effect, reference will now be made, by way of example, to the following drawings in which.

DETAILED DESCRIPTION

The embodiments relate to client software executed on an end user device that is arranged to operate in one of a plurality of different operating modes. The client software dynamically communicates a filter of events to a central control node in a communication network. The filter of events is associated with the operating mode that the client software is operating in, and define the types of communication events that the end user device is permitted to receive when the client software is operating in the operating mode.

Embodiments will now be described by way of example only.

Figure 1:
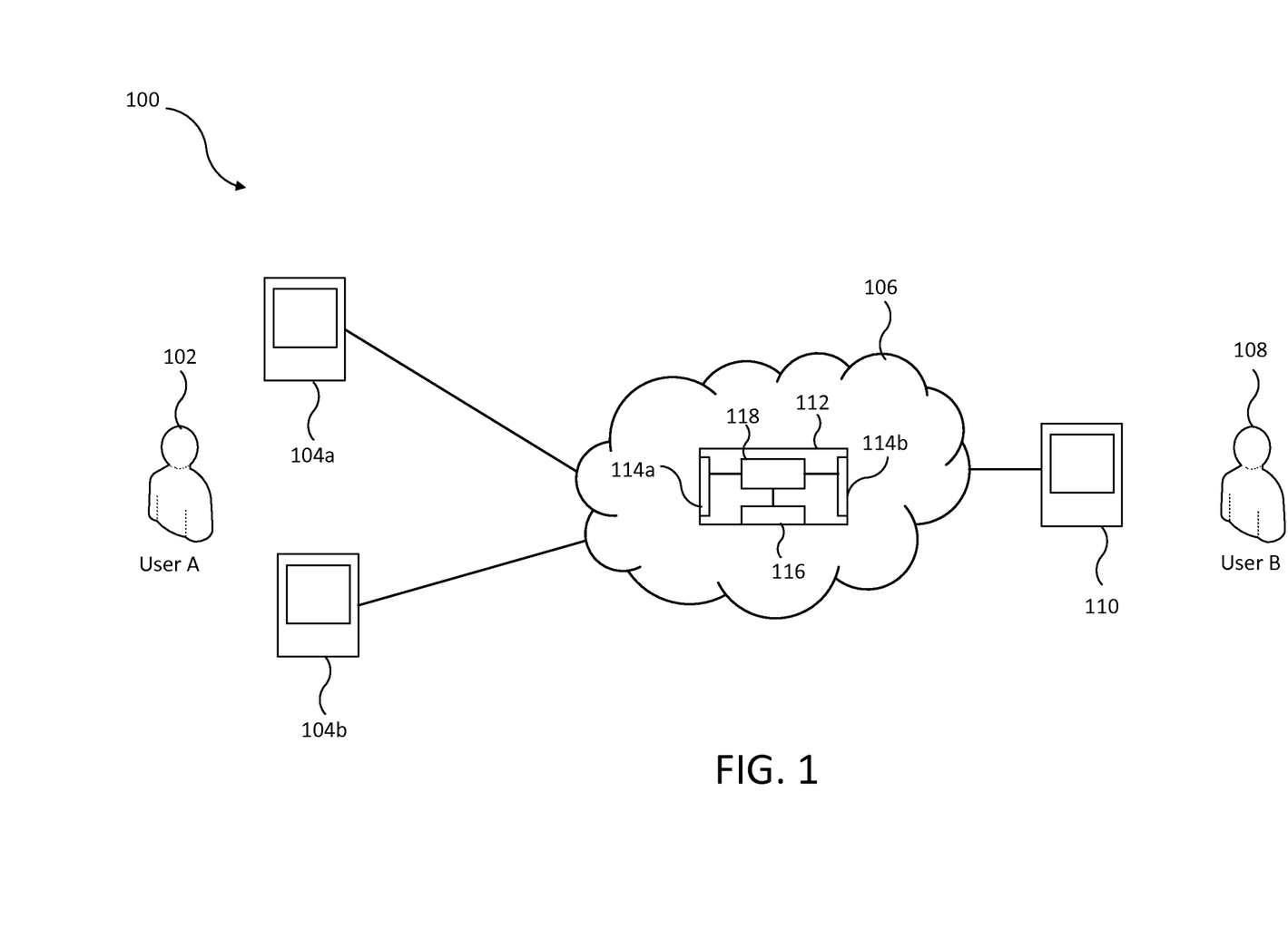
FIG. 1 shows a schematic illustration of a communication system.

FIG. 1 shows a communication system 100 comprising a first user 102 ("User A") who is associated with a first user device 104a and a second user device 104b and a second user 108 ("User B") who is associated with a third user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The network 106 comprises a control node 112 which can be used to facilitate communication over the network 106. The control node 112 may be a server. Other network nodes may also be included in the network 106 but only one network node (control node 112) is shown in FIG. 1 for simplicity. The control node 112 comprises a central processing unit 118 ("CPU") or "processing module", to which is connected: a data store 116 for storing data i.e. memory, a first network interface 114a and a second network interface 114b. Whilst separate control node network interfaces are shown in FIG. 1 the first network interface 114a and the second network interface 114b may be of the same network interface 114.

The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user devices 104 are arranged to receive information from and output information to the user 102 of the user devices 104. The user devices 104 comprise output means such as a display and speakers. The user devices 104 also comprise input means such as a keypad, a touch-screen, mouse, a microphone for receiving audio signals and/or a camera for capturing images of a video signal. The user devices 104 are connected to the network 106.

Note that in alternative embodiments, the user devices can connect to the network 106 via additional intermediate networks not shown in FIG. 1. For example, if the user device 104 is a mobile device, then it can connect to the network 106 via a cellular mobile network, not shown in FIG. 1.

The user devices 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user devices 104 and executes, on a local processor, a communication client which corresponds to the communication client executed at the user devices 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100.

FIG. 1 shows only two users (102 and 108) for clarity, but many more users and user devices may be included in the communication system 100, and may communicate over the communication system 100 using respective communication clients executed on the respective user devices. Whilst FIG. 1 shows two user devices (104a and 104b) associated with user 102, the user 102 may be associated with a single device or may be associated with more than two devices.

Figure 2:
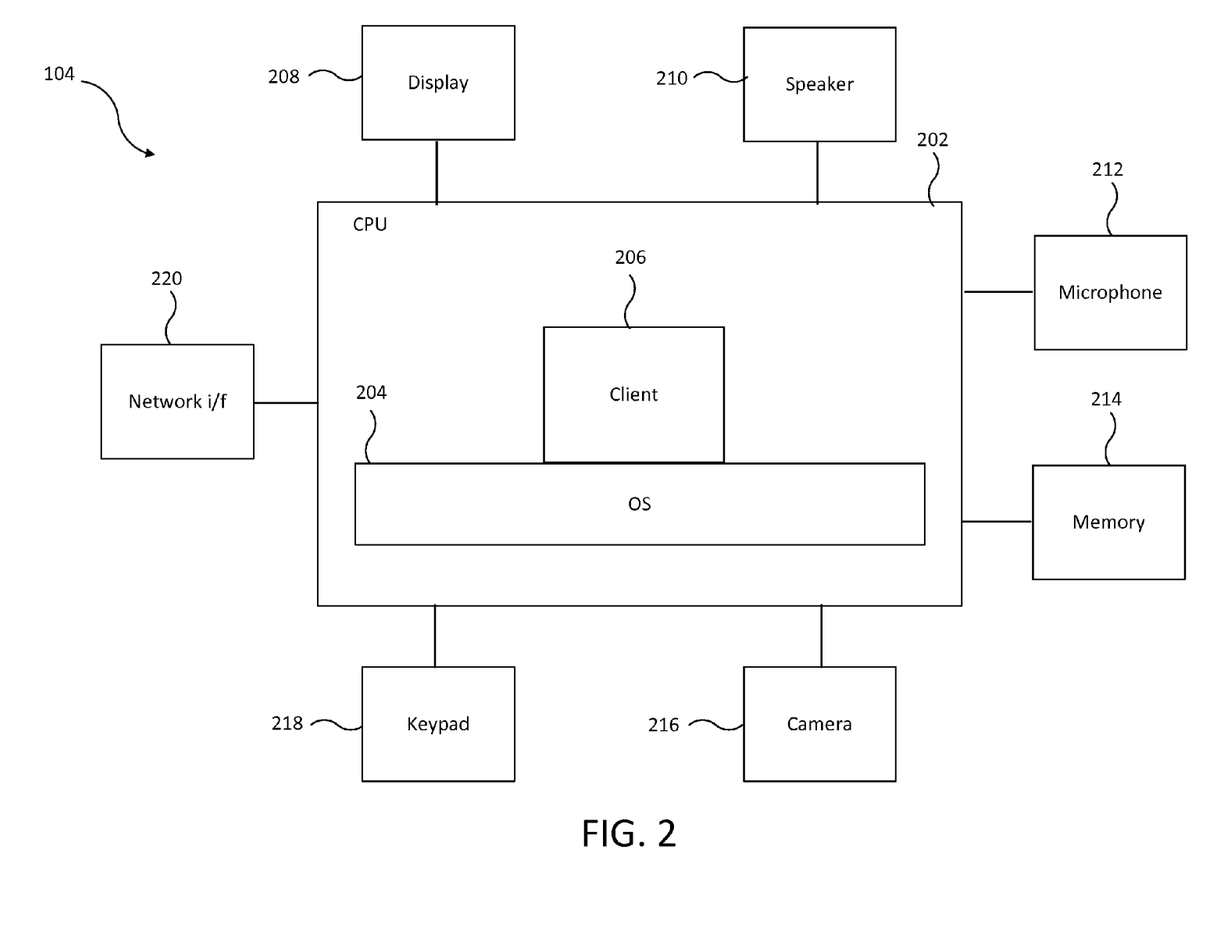
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 104. In this way, the client 206 performs the processing required to allow the user 102 to communicate over the communication system 100.

Figure 3:
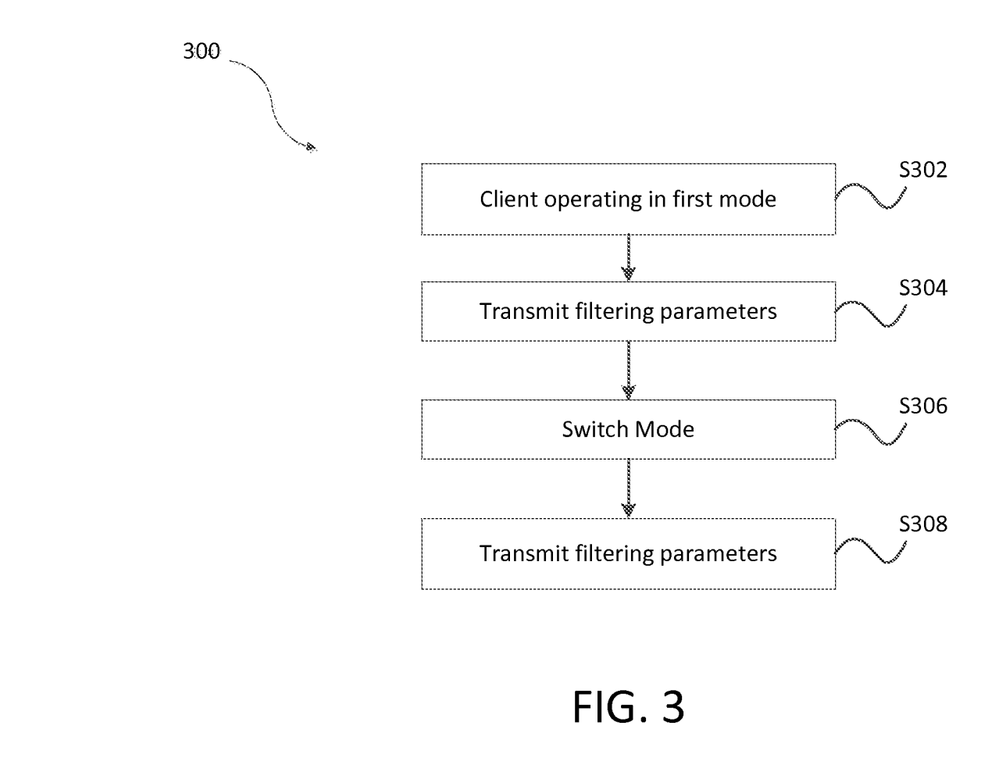
FIG. 3 is a flow chart for a process of receiving communication events at a user device associated with a user.
Figure 4:
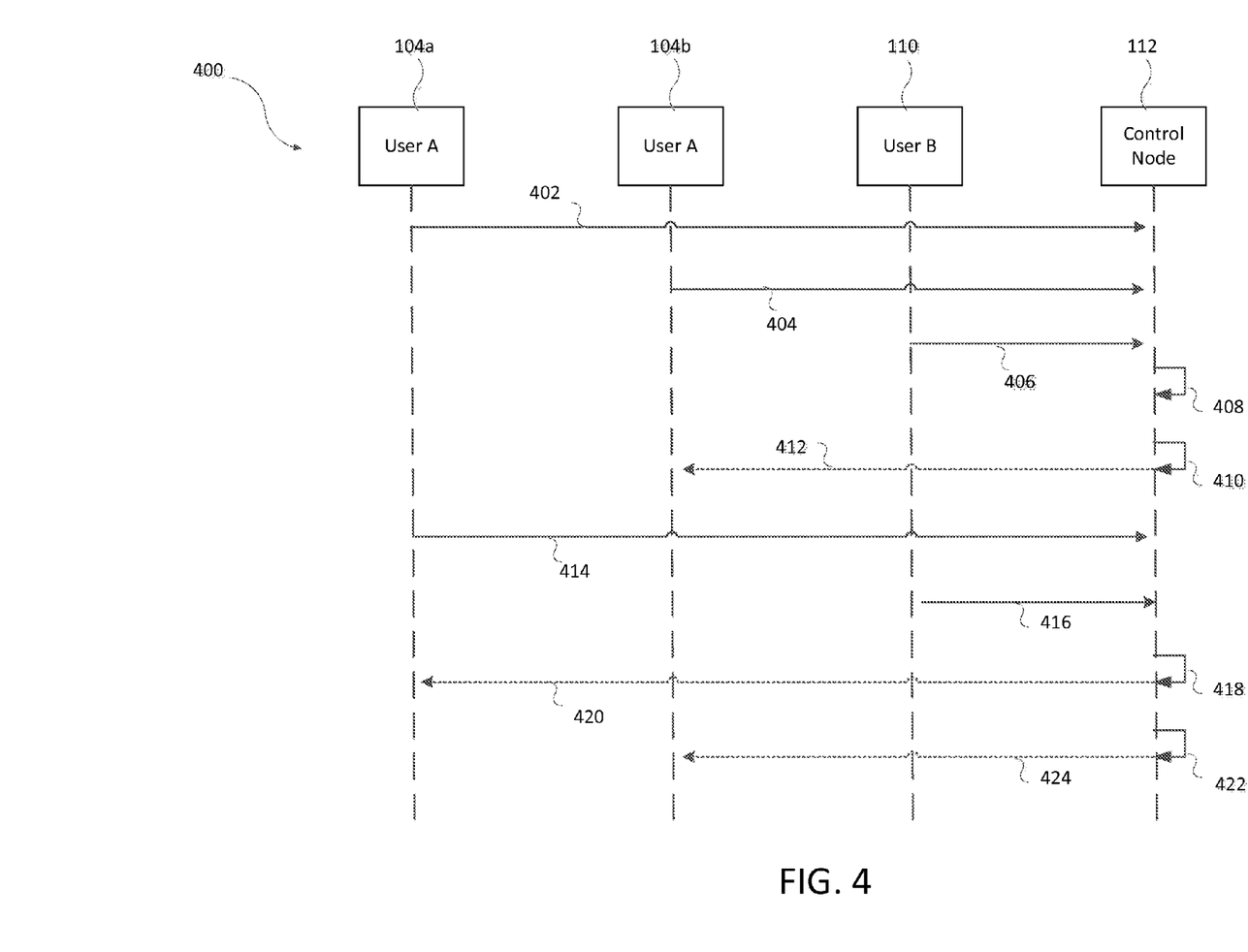
FIG. 4 is a signalling diagram illustrating a user receiving communication events at multiple user devices associated with the user.

With reference to FIGS. 3 and 4 there is now described a method of delivering communication events to a user over a network.

FIG. 3 is a flow chart for a process 300 of delivering communication events to a user A 102 associated with a single user device (user device 104a) in dependence on the mode in which the client 206 (executed on user device 104a) is operating in.

In embodiments, the client 206 is arranged to operate in one of a plurality of operating modes. Each of the plurality of modes are associated with a respective set of filtering parameters. The filtering parameters associated with each operating mode may be stored in memory 214. These filtering parameters define the types of communication events that are to be received at the user device 104a from the network 106 when the client 206 is operating in the respective mode.

The process 300 starts at step S302 whereby the client 206 is operating in a first operating mode.

For example, the client 206 may be arranged to operate in a "foreground active" operating mode wherein the client 206 is running and the client 206 is arranged to display a client user interface on the display 208. The client 206 may also be arranged to operate in a "background" operating mode wherein the client 206 is running but the client 206 is arranged not to display a client user interface on the display 208 (i.e. the client is running in the background).

The "foreground active" operating mode is associated with filtering parameters that define the types of communication events that are permitted to be received at the user device 104a when the client 206 executed on user device 104a is operating in the "foreground active" mode. The "foreground active" operating mode may be associated with filtering parameters that define that all types of communication events are permitted to be received whilst the client 206 executed on user device 104a is operating in the "foreground active" mode.

Similarly, the "background" operating mode is associated with filtering parameters that define the types of communication events that are permitted to be received at the user device 104a whilst the client 206 executed on the user device 104a is operating in the "background" mode. The "background" operating mode may be associated with filtering parameters that define that only call related communication events (i.e. a voice call, a video call, or a multi-user voice or video call) are permitted to be received at the user device 104a whilst the client 206 executed on user device 104a is operating in the "background" mode.

The filtering parameters associated with each operating mode are selected by the software provider providing the client 206. In particular, the filtering parameters that are associated with each mode that the client 206 may operate in are preconfigured in the client 206 by the software provider. Thus, the types of communication event that are permitted to be received at the user device 104a when the client 206 is in these respective modes is selected by the software provider providing the client 206. The types of communication events that may be permitted in a particular operating mode include one or more of a voice call, a video call, a multi-user voice or video call, an IM chat, a multi-user IM chat (e.g. for software development), a file transfer, a presence notification or another packet based communication.

In step S304, the client 206 detects the operating mode (first operating mode) that it is currently operating in and accesses the filtering parameters associated with this operating mode from memory 214. The client 206 transmits the filtering parameters associated with the first operating mode to the control node 112 in the communications network 106 via the network interface 220.

The control node 112 is arranged to receive the filtering parameters from the user device 104a at the network interface 114a. The control node 112 is arranged to store the filtering parameters associated with the first operating mode that it receives from the user device 104a in the data store 116. Any filtering parameters previously received from the user device 104a and stored in the data store 116 are removed from the data store 116. The control node 112 is also arranged to receive communication events from users of the communication system 100 at the network interface 114b that are to be sent to user device 104a. For simplicity FIG. 1 shows a single user device (user device 110) that may transmit communication events to user device 104a, however it will be appreciated that the communication system will typically have many different user devices that may transmit communication events to user device 104a. The control node 112 is arranged to filter communication events directed to user 102 that are received at the network interface 114b from users of the communication system 100. That is, the control node 112 makes decisions on what communication events are to be actively communicated to the user device 104a, and which communication events are to be handled by itself, based on the filtering parameters it receives from the user device 104a.

Whilst the user device 104a is operating in the first operating mode, a communication event directed to user 102 may be received at the control node 112 at the network interface 114b. If such a communication event is received at the control node 112 whilst the user device 104a is operating in the first operating mode the CPU 118 operates to compare the incoming communication event to the filtering parameters associated with the first operating mode held in the data store 116 of the control node 112. If the CPU 118 determines that the incoming communication event is a type of communication which is permitted to be received at the user device 104a whilst the client 206 is in the first mode (determined based on the filtering parameters), the CPU 118 transmits the communication event received from user device 110 to user device 104a.

If CPU 118 determines that the incoming communication event is not a type of communication which is to be received at user device 104a whilst user device 104a is in the first mode, the CPU 118 does not transmit the communication event to the user device 104a. Thus, when the client 206 is in the first operating mode, the user device 104a only receives communication events from the control node 112 that are associated with the first operating mode. How the control node 112 may handle incoming communication events that do not pass through the filtering implemented at the control node 112 is described in more detail below.

In step S306, whilst operating in the first mode, the client 206 detects that it should change operating mode i.e. to change from operating in the first mode to operate in a second mode. The client 206 may detect that it should change operating mode in a number of ways.

The client 206 may detect a user input via input means on the user device 104a and change operating mode in response to this detection. For example, the client 206 may detect a user input via input means on the device 104a which turns off the display i.e. an input which places the device 104a in a state in which no data is output to the display 208 such that the display 208 is blank, and change from the "foreground active" operating mode (first mode) to the "background" operating mode (second mode). In another example, the client 206 may detect a user input via input means on the device 104a which causes the client user interface to be displayed on the display 208 (wherein the client user interface was not displayed on the display 208 prior to the user input) and change from the "background" operating mode (first mode) to the "foreground active" operating mode (second mode).

Alternatively, the client 206 may executes a timer, and the change of operating mode may be responsive to the client 206 detecting that no user input is received via input means of the device 104a in a predetermined time period. That is, the change of operating mode may occurs when the timer runs down from a certain time value to zero (count down timer) or reaches a certain threshold time (count up timer) from zero. The client 206 is arranged to reset the timer every time the client 206 detects user input via input means on the device 104a.

Alternatively, the client 206 may not change operating mode in response to detecting a user input. Instead, the client 206 may detect that the user device 104a is in a power saving mode and change mode in response to detecting that the user device 104a is in a power saving mode. For example, the OS 204 on which the client 206 is executed may activate a screensaver to be displayed on the display 208 after a period of time of inactivity in which no user input is received via input means on the device 104a. The client 206 may detect that the user device 104a is in a power saving mode (i.e. a screensaver is being displayed on the display 208) and change from the "foreground active" operating mode (first mode) to the "background" operating mode (second mode).

In response to the client 206 detecting that the client 206 should change operating mode, the client 206 changes mode i.e. changes from operating in the first mode to operate in a second mode. In response to the client 206 changing operating mode, the client 206 is arranged to access the filtering parameters associated with this new operating mode (second mode) from memory 214 and transmit the filtering parameters associated with the new operating mode to the control node 112.

As described above, the filtering parameters associated with each operating mode are selected by the software provider providing the client 206 and stored in memory 214 thus the client 206 can access the filtering parameters that are associated with each mode it may operate in. Therefore when the client 206 changes from operating in the first mode to operate in a second mode, the client 206 can access the filtering parameters that are associated with the second operating mode.

In step S308, the client 206 transmits the filtering parameters associated with the second operating mode to the control node 112 in the communications network 106 via the network interface 220.

The control node 112 is arranged to store the filtering parameters associated with the second operating mode that it receives from the user device 104a in the data store 116. The filtering parameters associated with the first operating mode previously received from the user device 104a and stored in the data store 116 are removed from the data store 116.

Whilst the user device 104a is operating in the second operating mode, a communication event directed to user 102 may be received at the control node 112 at the network interface 114b. If such a communication event is received at the control node 112 whilst the user device 104a is operating in the second operating mode the CPU 118 operates to compare the incoming communication event to the filtering parameters associated with the second operating mode held in the data store 116 at the control node 112. If the CPU 118 determines that the incoming communication event is a type of communication which is permitted to be received at the user device 104a whilst the client 206 is in the second operating mode (determined based on the filtering parameters), the CPU 118 transmits the communication event received from user device 110 to user device 104a.

If the CPU 118 determines that the incoming communication event is not a type of communication which is to be received at user device 104a whilst the user device 104a is in the second operating mode, the CPU 118 does not transmit the communication event to the user device 104a. Thus, when the client 206 is in the second operating mode, the user device 104a only receives communication events from the control node 112 that are associated with the second operating mode.

The client 206 may transmit information to the control node 112 indicating how the control node 112 is to handle incoming communication events that do not pass through the filtering implemented at the control node 112. In particular, the client 206 may specify how the control node 112 should handle incoming communication events that do not pass through the filtering implemented at the control node 112 when the client 206 is in a particular operating mode. This information may be supplied when the client 206 supplies the filtering parameters associated with the particular operating mode to the control node 112 (for example in steps S304 and S308 shown in FIG. 3) and held in data store 116.

How the control node 112 handles incoming communication events that do not pass through the filtering implemented at the control node 112 is now described.

The information transmitted to the control node 112 on how to handle incoming communication events that are not permitted to be received by the user device 104a when the communication client application is operating in a particular operating mode may indicate that the control node 112 is to ignore these communication events. That is, if the CPU 118 determines that the incoming communication event is not a type of communication which is to be received at user device 104a whilst the user device 104a is in a specific operating mode, the control node 112 may simply ignore the communication event received from user device 110 destined to user device 104a. In this case, the control node 112 does not store any information pertaining to the communication event received from user 110 and user 102 is not notified of the attempted communication by user 108.

Alternatively, the information transmitted to the control node 112 on how to handle incoming communication events that are not permitted to be received by the user device 104a when the communication client application is operating in a particular operating mode may indicate that the control node 112 is to transmit a response to the user device (i.e. user device 110) which transmitted the communication event.

That is, if the CPU 118 determines that the incoming communication event is not a type of communication which is to be received at user device 104a whilst the user device 104a is in a specific operating mode, the control node 112 may answer on behalf of the user device 104a by the CPU 118 transmitting a response to the user device 110. This response may indicate to the user device which transmitted the communication event that the type of communication event it transmitted is not permitted to be received at the user device 104a whilst the client 206 executed on user device 104a is in its current operating mode and/or which types of communication events that the user device 104a is permitted to receive whilst the client 206 is in its current operating mode. For example, if the user device 110 executes client software and user B 108 initiates a voice call to the user 102, and the client 206 on user device 104a is in an operating mode which is associated with filtering parameters which define that only IM messages are permitted to be received at the user device 104a when the client 206 on user device 104a is in this operating mode, the control node 112 may update user B 108 by playing an audible message to user B 108 (output from the speakers of the user device 110) explaining that user A 102 is logged into client 206 and is available for incoming IM messages only on user device 104a.

The control node 112 may be capable of storing incoming communication events, for example IM messages and data files to be transferred to the user device 104a. The information transmitted to the control node 112 on how to handle incoming communication events that are not permitted to be received by the user device 104a when the communication client application is operating in a particular operating mode may indicate that control node 112 is store these communication events for future delivery to the user device 104a. That is, the control node 112 may store the incoming communication events in data store 116 (i.e. the same store which is arranged to hold filtering parameters) or in a separate data store. Thus, if the CPU 118 determines that an incoming communication event is not a type of communication which is to be received at user device 104a whilst the user device 104a is in a specific operating mode, the CPU 118 may store the incoming communication event. The control node 112 will wait until it receives an indication from client 206 (by way of receiving filtering parameters) that the client 206 is in an operating mode that allows the stored incoming communication event to be received at user device 104a, before delivering the stored communication event (i.e. IM message or data file) to the user device 104a. Once the control node 112 has delivered the communication event it may remove the communication event from storage.

The control node 112 may also be capable of storing information relating to an incoming communication event, for example information relating to an attempted voice or video call i.e. name of caller and time of call. The information transmitted to the control node 112 on how to handle incoming communication events that are not permitted to be received by the user device 104a when the communication client application is operating in a particular operating mode may indicate that control node 112 is store information relating to these incoming communication events for future delivery to the user device 104a. That is, the control node 112 may store information relating to an incoming communication event in data store 116 (i.e. the same store which is arranged to hold filtering parameters) or in a separate data store. Thus, if the CPU 118 determines that an incoming communication event is not a type of communication which is to be received at user device 104*a* whilst the user device 104*a* is in a specific operating mode, the control node 112 may store the information relating to the incoming communication event. The control node 112 will wait until it receives an indication from client 206 (by way of receiving filtering parameters) that the client 206 is in an operating mode that allows the attempted incoming communication event to be received at user device 104*a* before delivering the information relating to the attempted incoming communication event to the user device 104*a*. Once the control node 112 has delivered the information relating to the attempted incoming communication event it may remove the information from storage.

Whilst embodiments above have been described with reference to delivering communication events to a user associated with a single device (user device 104*a*) in dependence on the mode in which the client 206 executed on the single device is operating in, embodiments may extend to a single user being connected to the communication service from multiple endpoints and having different end user modality functionality for these endpoints.

FIG. 4 is a signalling diagram 400 illustrating delivery of communication events to a user 102 associated with a plurality of user devices. In particular FIG. 4 illustrates the delivery of communication events to the plurality of user devices in dependence on the mode in which the client executed on the respective user devices is operating in.

A user 102 may be associated with multiple user devices, these are shown in FIG. 1 as user device 104*a* and 104*b*. For example the user 102 may be associated with a mobile telephone 104*a* and a desktop computer 104*b*. Whilst embodiments are described with reference to user A 102 being associated with two devices for simplicity. It will be appreciated that the user 102 may be associated with more than two devices. As described above, each of the user devices 104*a* and 104*b* execute client software on the device. In the description below the client executed on user device 104*a* is referred to as client 206 and the client executed on user device 104*b* is referred to as client 206'.

Mobile telephone 104*a* is arranged to function in accordance with the process 300 shown in FIG. 3. Thus when client 206 is in a particular operating mode the client 206 transmits the filtering parameters associated with that operating mode to the control node 112 as shown by signal 402 to register the filtering parameters at the control node 112 for mobile telephone 104*a*. As a mere example, the signal 402 may comprise filtering parameters associated with a "background" mode that the client 206 is operating in. Thus these filtering parameters may indicate, for example, that the mobile telephone 104*a* is permitted to receive only call related communication events (i.e. a voice call, a video call, or a multi-user voice or video call) and thus IM messages should not be received when the client user interface of the client 206 is not displayed on the display of the mobile telephone 104*a*.

The control node 112 is arranged to store the filtering parameters that it receives from the mobile telephone 104*a* in the data store 116. Any filtering parameters previously received from the mobile telephone 104*a* and stored in the data store 116 are removed from the data store 116.

As described above, the client 206 may also transmit information to the control node 112 indicating how the control node 112 is to handle communication events which are not permitted to be received by the mobile telephone 104*a* when the client 206 is operating in the particular operating mode.

Desktop computer 104*b* is also arranged to function in accordance with the process 300 shown in FIG. 3. Thus when client 206' is in a particular operating mode the client 206' transmits the filtering parameters associated with that operating mode to the control node 112 as shown by signal 404 to register the filtering parameters at the control node 112 for desktop computer 104*b*. As a mere example, the signal 404 may comprise filtering parameters associated with a "foreground active" mode that the client 206' is operating in. Thus these filtering parameters may indicate, for example, that the desktop computer 104*b* is permitted to receive all types of communication events.

The control node 112 is arranged to store the filtering parameters hat it receives from the desktop computer 104*b* in the data store 116. Any filtering parameters previously received from the desktop computer 104*b* and stored in the data store 116 are removed from the data store 116.

As described above, the client 206' may also transmit information to the control node 112 indicating how the control node 112 is to handle communication events which are not permitted to be received by the desktop computer 104*b* when the client 206' is operating in the particular operating mode.

It will be apparent from the above that the data store 116 in the control node 112 may store the same or different filtering parameters for use in delivering communication events to different user devices, whereby the different user devices are associated with the same user.

As described above, the user device 110 executes client software on the device. User 108 is able to use the client software executed on user device 110 to transmit a communication event to user 102 as shown by signal 406. For mere illustration purposes, the communication event sent in signal 406 is an IM message. The IM message transmitted by the user device 110 is received at the network interface 114*b* of the control node 112.

In response to receiving the IM message from user device 110, the CPU 118 operates to compare the IM message to the filtering parameters for mobile telephone 104*a* held at the control node 112 in data store 116. This comparison carried out in the control node 112 is shown as internal signalling 408. As shown in FIG. 4, because the filtering parameters held for mobile telephone 104*a* indicate that only call related communication events are permitted to be received at the mobile telephone 104*a* (i.e. IM messages are not to be sent to the mobile telephone 104*a*) the IM message does not pass through the filtering implemented at the control node 112 and thus the control node 112 does not deliver the IM message to the mobile telephone 104*a*. As described above, the control node 112 may store the IM message for future delivery to the mobile telephone 104*a*.

In response to receiving the IM message from user device 110, the CPU 118 also operates to compare the IM message to the filtering parameters for desktop computer 104*b* held at the control node 112 in data store 116. This comparison carried out in the control node 112 is shown as internal signalling 410. As shown in FIG. 4, because the filtering parameters held for desktop computer 104*b* indicate that all types of communication events are permitted to be received at the desktop computer 104*b* (including IM messages), the IM message passes through the filtering implemented at the control node 112 and thus the control node 112 delivers the IM message to the desktop computer 104*b* as shown by signal 412.

FIG. 4 shows the client 206 executed on mobile telephone 104a transmitting a new set of filtering parameters in signal 414 to the control node 112 to register the new filtering parameters at the control node 112 for mobile telephone 104a. This transmission is responsive to the client 206 changing operating mode and the new set of filtering parameters is associated with the new operating mode. As a mere example, the client 206 may switch from the "background" mode to the "foreground active" mode and transmit filtering parameters in signal 414 associated with the "foreground active" mode to the control node 112. Taking the example above, these filtering parameters indicate that the mobile telephone 104a should receive all types of communication events whilst in the "foreground active" mode.

The control node 112 is arranged to store the new filtering parameters associated with the new operating mode of client 206 that it received from the mobile telephone 104a in signal 414 in data store 116. The filtering parameters associated with the previous operating mode of the client 206 that it received from the mobile telephone 104a in signal 402 are removed from the data store 116.

As shown in FIG. 4, the user 108 uses the user device 110 to transmit a further communication event to user 102 in signal 416. For mere illustration purposes, the communication event sent in step S416 is a further IM message. The further IM message transmitted by the user device 110 is received at the network interface 114b of the control node 112

In response to receiving the further IM message from user device 110, the CPU 118 operates to compare the IM message to the filtering parameters for mobile telephone 104a held at the control node 112 in data store 116. These filtering parameters are the parameters received by the control node in signal 414. This comparison carried out in the control node 112 is shown as internal signalling 418. As shown in FIG. 4, because the filtering parameters held for mobile telephone 104a now indicate that all types of communication events are permitted to be received at the mobile telephone 104a (including IM messages), the further IM message passes through the filtering implemented at the control node 112 and thus the control node 112 delivers the further IM message to the mobile telephone 104a as shown by signal 420.

In response to receiving the further IM message from user device 110, the CPU 118 also operates to compare the further IM message to the filtering parameters for desktop computer 104b held at the control node 112. These filtering parameters are the parameters received by the control node in signal 404 because the client 206' has not changed operating mode. This comparison carried out in the control node 112 is shown as internal signalling 422. As shown in FIG. 4, because the filtering parameters held for desktop computer 104b indicate that all types of communication events are permitted to be received at the desktop computer 104b (including IM messages), the further IM message passes through the filtering implemented at the control node 112 and thus the control node 112 delivers the further IM message to the desktop computer 104b as shown by signal 424.

Embodiments can allow only communication events to be delivered to a user device that are appropriate given the operating mode of the client software executed on the user device. When a user is associated with more than one device, embodiments allow communications for the user to be delivered to an appropriate user device given the operating mode of the client software executed on the respective user devices. If a user is active on more than one endpoint, embodiments allow delivery of different communication events to different endpoints. Embodiments avoid a node in the communication network transmitting communication events to a user device when the client software executed on the user device is not operating in an appropriate mode to inform the user of the received communication event.

Embodiments can allow only communication events to be handled centrally in a node of a communication network. Thus user devices do not have to incur the computational expense of processing incoming communications and handling the selection of particular communication events for output to a user.

Whilst the transmission of filtering parameters from user devices 104 to the control node 112 has been described above with reference to the client software executed on user devices 104 changing operating mode. It will be appreciated that that when client software is first launched on a device and into an operating mode, the client software operates to transmit the filtering parameters associated with this operating mode to the control node 112 to control the communications events received at the device whilst the client software is in this operating mode.

Whilst it has been described above with reference to FIG. 4 that filtering parameters that the control node 112 receives from the mobile telephone 104a and desktop computer 104b are stored in portions of the same data store 116 it will be appreciated that filtering parameters that the control node 112 receives from different devices may be stored in separate data stores.

The methods described herein may be implemented by executing a computer program product (e.g. the client 206) at a user device 104. That is, a computer program product may be configured to control the receipt of communication events from a communication network, wherein the computer program product is embodied on a computer-readable storage medium (e.g. stored in the memory 214) and configured so as when executed on the CPU 202 to perform the operations of any of the methods described herein.

Generally, any of the functions described herein (e.g. the functional modules shown in FIG. 2 and the functional steps shown in FIG. 3) can be implemented using software, firmware, hardware (e.g., fixed logic circuitry), or a combination of these implementations. The modules and steps shown separately in FIGS. 2 and 3 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of filtering communication events communicated over a communications network for receipt by a first user terminal, the method comprising:
    employing a communication client application by the first user terminal to handle communication events received at the first terminal, the communication client application configured to operate in one of a plurality of operating modes based on a user interface of the communication client being active, wherein each of the plurality of operating modes is associated with respective filtering parameters that are preconfigured by a software provider to permit the communication client application to receive communication events selected by the software provider when operating in the associated operating mode;
    storing the filtering parameters associated with each of the plurality of operating modes in storage of the first user terminal;
    detecting an operating mode in which the communication client application is operating and accessing the respective filtering parameters associated with the detected operating mode from the storage;
    generating a communication for transmission to a node in the communications network by the first user terminal, the node configured as a computing device coupled to the communications network, and the generating including configuring the communication to include the respective filtering parameters associated with the detected operating mode and cause removal from the node of other filtering parameters associated with a previously-detected operating mode of the first user terminal, the previously-detected operating mode based on the user interface of the communication client being inactive, the other filtering parameters associated with the previously-detected operating mode defining zero or more types of communication events that are permitted to be received at the first user terminal, the other filtering parameters defining fewer types of communication events that are permitted to be received at the first user terminal than the filtering parameters that are associated with the determined operating mode;
    transmitting the communication over the communications network to the node, the communication enabling the node to filter communication events intended for receipt by the first user terminal based on a determination as to whether the communication events correspond to one or more types of the communication events that the first user terminal is permitted to receive according to the respective filtering parameters associated with the detected operating mode; and
    receiving the communication events corresponding to the one or more types of communication events at the first user terminal from the node when the communication client application is operating in the detected operating mode.

2. The method of claim 1, wherein the plurality of operating modes includes a first operating mode in which the communication client application causes the user interface to be displayed on a display of the first user terminal.

3. The method of claim 2, wherein the respective filtering parameters associated with the first operating mode define that each of the types of communication events are permitted to be received at the first user terminal when the communication client application is operating in the first operating mode.

4. The method of claim 2, wherein the plurality of operating modes includes a second operating mode in which the communication client application does not cause a user interface to be displayed on the display of the first user terminal.

5. The method of claim 4, wherein the respective filtering parameters associated with the second operating mode define that call related communication events are permitted to be received at the first user terminal and other communication events are not permitted to be received at the first user terminal when the communication client application is operating in the second operating mode.

6. The method of claim 1, wherein the transmission of the communication to the node is performed responsive to a change of operating mode into the detected operating mode from a previous operating mode.

7. The method of claim 6, wherein the change of operating mode into the detected operating mode from the previous operating mode is responsive to the communication client application detecting a user input received by the first user terminal.

8. The method of claim 6, wherein the change of operating mode into the detected operating mode from a previous operating mode is responsive to the communication client application detecting a user input received by the first user terminal that is effective to place the first terminal in a state in which no data is output via a display of the first user terminal.

9. The method of claim 6, wherein the change of operating mode into the detected operating mode from the previous operating mode is responsive to the communication client application detecting that the first user terminal is in a power saving mode.

10. The method of claim 9, wherein the first user terminal is in the power saving mode after a period of inactivity in which no user input is received by the first user terminal.

11. The method of claim 6, wherein the communication client application includes a timer, and the change of operating mode into the detected operating mode from the previous operating mode is responsive to the communication client application detecting that no user input has been received by the first user terminal in a predetermined time period timed by the timer.

12. The method of claim 1, further comprising transmitting information to the node that indicates how the node is to handle communication events that the first user terminal is not permitted to receive when the communication client application is operating in the detected operating mode.

13. The method of claim 12, wherein the information indicates that the node is to transmit a response to a user terminal when a communication event from the user terminal is received at the node which is not permitted to be received by the first user terminal when the communication client application is operating in the detected operating mode.

14. The method of claim 12, wherein the information indicates that the node is to store communication events which are not permitted to be received by the first user terminal when the communication client application is operating in the detected operating mode for future delivery to the first user terminal.

15. The method of claim 12, wherein the information indicates that the node is to store information relating to the communication events which are not permitted to be received by the first user terminal when the communication client application is operating in the detected operating mode for future delivery to the first user terminal.

16. The method of claim 12, wherein the information indicates that the node is to ignore communication events which are not permitted to be received by the first user terminal when the communication client application is operating in the detected operating mode.

17. The method of claim 1, wherein the types of communication events include: a voice call; a video call; a multi-user voice or video call; an instant message; a multi-user instant message; and a file transfer.

18. A node coupled to a communications network, the node comprising:
   a network interface configured to receive a communication via the communications network that includes filtering parameters from a first communication client application of a first user terminal associated with a user, the filtering parameters associated with one of a plurality of modes in which the first communication client application is configured to operate and defining one or more types of communication events that the first user terminal is permitted to receive from the communications network when the first communication client application is operating in the one operating mode, the one operating mode including a user interface of the first communication client application being active,
   wherein the network interface is further configured to receive at least one other communication via the communications network that includes further filtering parameters from one or more further communication client applications of one or more further user terminals associated with the user, the further filtering parameters associated with one of a plurality of modes in which the one or more further communication client applications are configured to operate and defining one or more types of communication events that the one or more further user terminals are permitted receive from the network when the one or more further communication client applications are operating in the one operating mode,
   wherein the network interface is further configured to receive a communication event for the user;
   storage configured to store the filtering parameters and the further filtering parameters; and
   a processor configured to:
   remove from the storage previously-received filtering parameters associated with previously-detected operating modes of the first communication client application and the one or more further communication client applications responsive to receipt of the communication from the first user terminal and the at least one other communication from the one or more further user terminals, respectively, a previously-detected operating mode based on the user interface of the first communication client application being inactive, the previously-received filtering parameters associated with the previously-detected operating mode defining zero or more types of communication events that are permitted to be received at the user terminal, the previously-received filtering parameters defining fewer types of communication events that are permitted to be received at the first user terminal than the filtering parameters that are associated with the one operating mode; and
   compare the received communication event to both the filtering parameters and the further filtering parameters stored in said storage to determine if the communication event corresponds to a type of communication event that is defined in the filtering parameters as being permitted for receipt by the first user terminal and determine if the communication event corresponds to a type of communication event that is defined in the further filtering parameters as being permitted for receipt by the one or more further user terminals, and control transmission of the communication event to the first user terminal based on the comparison, and to the one or more further user terminals based on the comparison.

19. The node of claim 18, wherein the processor is further configured to handle communication events that are intended for receipt by the first user terminal but are not permitted by a current operating mode according to instructions received from the communication client application that indicate how to handle non-permitted communication events.

20. A user terminal comprising:
   a network interface;
   one or more processors; and
   computer-readable storage media having instructions stored thereon that are executable by the one or more processors to implement a communication client application that is configured to perform operations comprising:
   causing filtering parameters, that are associated with a plurality of operating modes in which the communication client application is configured to operate, to be stored on the computer-readable storage media;
   determining which of the plurality of operating modes in which to operate based on a user interface of the communication client being active;
   accessing the filtering parameters associated with the determined operating mode from the computer-readable storage media, the filtering parameters that are associated with the determined operating mode defining one or more types of communication events that are permitted to be received at the first user terminal when the communication client application is operating in the determined operating mode;
   generating a communication for transmission to a node configured as a computing device and communicably coupled to the user terminal via a communications network, the generating including configuring the communication to include the filtering parameters associated with the determined operating mode and cause removal from storage of the node of other filtering parameters received from the user terminal that are associated with a previously-determined operating mode of the user terminal, the previously-determined operating mode based on the user interface of the communication client being inactive, the other filtering parameters associated with the previously-determined operating mode defining zero or more types of communication events that are permitted to be received at the user terminal, the other filtering parameters defining fewer types of communication events that are permitted to be received at the user terminal than the filtering parameters that are associated with the determined operating mode; and causing transmission of the communication via the communications network to the node via the network interface, the communication enabling the node to filter communication events intended for receipt by the user terminal based on a determination as to whether the communication events correspond to the one or more types of communication events that the user terminal is permitted to receive.

\* \* \* \* \*